(12) United States Patent
Yamataki et al.

(10) Patent No.: US 9,199,599 B2
(45) Date of Patent: Dec. 1, 2015

(54) PASSENGER PROTECTION DEVICE (71) Applicants: Norio Yamataki, Tokyo (JP); Hikaru Kameyoshi, Tokyo (JP); Atsushi Ichida, Tokyo (JP); Tatsuya Higuchi, Tokyo (JP)

(72) Inventors: Norio Yamataki, Tokyo (JP); Hikaru Kameyoshi, Tokyo (JP); Atsushi Ichida, Tokyo (JP); Tatsuya Higuchi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/371,959

(22) PCT Filed: Jan. 11, 2013

(86) PCT No.: PCT/JP2013/050408
§ 371 (c)(1),
(2) Date: Jul. 11, 2014

(87) PCT Pub. No.: WO2013/105639
PCT Pub. Date: Jul. 18, 2013

(65) Prior Publication Data
US 2014/0353950 A1    Dec. 4, 2014

(30) Foreign Application Priority Data
Jan. 11, 2012   (JP) ................. 2012-002881

(51) Int. Cl.
*B60R 21/18*    (2006.01)
*B60R 21/201*   (2011.01)
(Continued)

(52) U.S. Cl.
CPC ............. *B60R 21/201* (2013.01); *B60R 21/18* (2013.01); *B60R 22/18* (2013.01); *B60R 2021/0004* (2013.01); *B60R 2021/0006* (2013.01); *B60R 2021/0044* (2013.01); *B60R 2022/006* (2013.01)

(58) Field of Classification Search
CPC ...... B60R 21/18; B60R 21/126; B60R 21/201
USPC ................................. 280/728.1, 733
See application file for complete search history.

(56) References Cited

U.S. PATENT DOCUMENTS 5,248,187 A * 9/1993 Harrison ............... 297/482
6,237,945 B1 * 5/2001 Aboud et al. .......... 280/733
(Continued)

FOREIGN PATENT DOCUMENTS

JP    2000-142303 A    5/2000
JP    2004-058698 A    2/2004
(Continued)

OTHER PUBLICATIONS

Azuma et al., Seat Belt with Air Bag, Feb. 12, 2009, JPO, JP 2009-029355 A, Machine Translation of Description.*
(Continued)

*Primary Examiner* — James English
(74) *Attorney, Agent, or Firm* — Fitch Even Tabin & Flannery LLP (57) ABSTRACT

A passenger protection device in which an airbag capable of expanding by receiving a predetermined action signal is disposed on the position of a shoulder belt, and a webbing is wound by means of one winding device, wherein the airbag is folded along a gate-shape guide-form slide guide having high-rigidity parts arranged to have a predetermined distance from one another along one side surface of a low-rigidity part extending in the lengthwise direction of the airbag can smoothly slide along the webbing via the slide guide when the webbing is being pulled out. Moreover, it is possible to fit the folded airbag between the chest and shoulder of a passenger because the slide guide is flexible.

10 Claims, 8 Drawing Sheets

(51) Int. Cl.
    *B60R 22/18*     (2006.01)
    *B60R 21/00*     (2006.01)
    *B60R 22/00*     (2006.01)

(56) References Cited

U.S. PATENT DOCUMENTS

8,882,141 B2 *   11/2014   Arnold et al. ................. 280/733
2013/0313811 A1 *   11/2013   Ichida et al. ................. 280/733

FOREIGN PATENT DOCUMENTS

| JP | 2007-131225 A | 5/2007 |
|----|---------------|--------|
| JP | 2009-001223 A | 1/2009 |
| JP | 2009-029355 A | 2/2009 |
| JP | 2009-029357 A | 2/2009 |
| JP | 2010-036836 A | 2/2010 |

OTHER PUBLICATIONS

International Search Report from the International Bureau of WIPO for International Application No. PCT/JP2013/050408 dated Mar. 12, 2013 (4 pages).

Takata Corporation, "Takata, Manufacturer of Safety System for Vehicle Exhibited Air Belt in Good Design Exposition 2011," Aug. 24, 2011, searched on Dec. 15, 2011 via internet <http://www.takata.com/pdf/110824_JP.pdf>).

European Search Report dated Sep. 4, 2015 for European Application No. 13735979.0.

* cited by examiner

BENDING DEFORMATION IN A PLANE

DISTORTION DEFORMATION

FIG.3C

BENDING DEFORMATION IN NON-PLANE DIRECTIONS

PASSENGER PROTECTION DEVICE

CROSS-REFERENCE TO RELATED APPLICATIONS

This application is a U.S. national phase application filed under 35 U.S.C. §371 of International Application No. PCT/JP2013/ 050408, filed on Jan. 11, 2013, designating the United States, which claims priority from Japanese Application No. 2012-002881, filed Jan. 11, 2012, which are hereby incorporated herein by reference in their entirety.

TECHNICAL FIELD

The present invention relates to a passenger protection device, particularly relates to a passenger protection device which detects a collision of a vehicle so as to be effective in restraining the passenger by causing an air bag which is folded inside a seat belt to expand from the chest to the shoulder.

BACKGROUND ART

The applicant has developed a passenger protection device (hereinafter, simply referred to as air belt apparatus) in which when vehicle collision occurs an air bag accommodated in a shoulder belt of a seat belt expands concentratedly from the chest to an upper portion of the shoulder when a vehicle collision occurs, and which allows use of one product to handle two types of accident such as a frontal collision and a lateral collision (Takata Corporation, "Takata, Manufacturer of Safety System for Vehicle Exhibited Air Belt in GOOD DESIGN EXPOSITION 2011," Aug. 24, 2011, searched on Dec. 15, 2011 via the internet <http://www.takata.com/pdf/110824_IP.pdf>).

In the air belt apparatus, the air bag expands in a substantial spindle shape along a shoulder belt fastened by a passenger. When the frontal collision occurs, the air bag inside the belt directly expands so that an area of the air bag that comes into contact with the chest of the passenger is widened, thereby dispersing and cushioning a shock to the chest. When the lateral collision occurs, an expansion portion holds the range from the upper portion of the chest to the temporal region of the passenger so as to control an amount of lateral movement of the head, thereby preventing a secondary collision against a side window or any structure inside a vehicle.

However, the air belt apparatus is equipped with two retractors, a retractor interposing a tong fixed to the seat belt so as to wind a lap belt and a retractor for winding the shoulder belt in which the air bag is accommodated as an air belt, thereby resulting in a high cost in manufacturing of the apparatus and resulting equipped only in a luxury vehicle.

In contrast, the development of an air belt apparatus is in progress allowing one retractor to pull out and wind the shoulder belt having the air belt built therein and the lap belt interposing a tong plate therebetween. Incidentally, in a case of utilizing one retractor, when webbing is pulled out of the retractor, the air belt portion needs to be able to smoothly slide with respect to the webbing so as to pull out a predetermined amount of the lap belt portion, and to cause the air belt portion (portion of shoulder belt) having the tong provided with the tong plate and a gas supply port at an end portion thereof to be located in an appropriate position from the chest to the shoulder.

Japanese Patent Application Publication No. 2009-029355 A discloses a seat belt apparatus having a flat tube which is made of a synthetic resin and is interposed between an air bag main body and the webbing. Japanese Patent Application Publication No. 2009-029355 A discloses various tubes of which rigidity (in longitudinal direction and width direction of tube) is adjusted in varying manners in order to reduce sliding friction of the webbing which is inserted into the flat tube and to ensure followability and flexibility when pulling out the webbing.

SUMMARY OF INVENTION

Incidentally, a seat belt apparatus disclosed in Japanese Patent Application Publication No. 2009-029355 A aims to reduce rigidity in two directions, a longitudinal direction and a width direction by arranging various openings or notches on surfaces of the various flat tubes described above, and thus, the rigidity of the tube in the width direction is also easily degraded. Therefore, when a passenger grasps an air belt portion to pull out from a retractor in order to fasten a seat belt, there is an occurrence of a problem that sliding friction increases when pulling out the seat belt due to coming into contact with the tube so as to cause a deformation of the tube and curling of webbing or so as to be pressed in a thickness direction to pinch the webbing. In addition, a side surface of the tube having relatively high rigidity comes into contact with the chest and the like of the passenger via an air bag, thereby easily causing discomfort when the seat belt is fastened. Therefore, an object of the present invention is to solve the problem of the above-described technology in the related art and to provide a passenger protection device which includes a slide guide having high rigidity in the width direction and the thickness direction of the webbing and having low rigidity in the longitudinal direction, and which is smoothly and relatively movable with respect to the webbing and is able to softly come into contact with the passenger along the chest when being fastened, as the air belt in which the air bag in a predetermined shape is folded to be accommodated having the slide guide as a core member.

In order to achieve the object, this invention provides with a passenger protection device including an air bag. The air bag is provided in a shoulder belt position of a seat belt to be able to expand by receiving a predetermined operation signal. The seat belt is wound by one winding device. The passenger protection device is characterized in that the air bag is folded along a slide guide being provided along an insertion direction of the seat belt and being configured to have a high rigidity portion and a low rigidity portion, and, when pulling out the seat belt, the air bag slides along the seat belt through the slide guide.

It is preferable that the slide guide includes: the low rigidity portion which configures a plate-shaped body fixed to the air bag; and the high rigidity portion which is integrally formed with the plate-shaped body and which configures a guide allowing the seat belt to pass through the guide.

It is preferable that the slide guide has gate-type or tubular-shaped guides which are arranged at predetermined intervals along a surface on one side of the plate-shaped body extending in a longitudinal direction of the air bag.

It is preferable that the high rigidity portion of the slide guide is a molded body made of a hard resin material and the low rigidity portion of the slide guide is a molded body made of a soft resin material.

It is preferable that the soft resin material of the slide guide is polyester elastomer and the hard resin material is a polyurethane resin.

It is preferable that the plate-shaped body of the slide guide is bonded or stitched to a tether surface which is provided in the air bag.

While it is preferable that the high rigidity portion and the low rigidity portion of the slide guide are configured to be made of materials of two or more types different in rigidity or to be made of the same materials different in rigidity grades, the high rigidity portion and the low rigidity portion of the slide guide might be made of the same resin material, and a difference of rigidity between the high rigidity portion and the low rigidity portion might be secured through cross-sectional shapes of members. In this case, it is preferable that the slide guide is provided with cut-outs which are cut out from ends on both sides of the low rigidity portion connecting the high rigidity portions, and a connection portion connecting the high rigidity portions is formed in a middle position in a width direction.

Otherwise, the slide guide might be provided with cut-outs which are cut out from ends on both sides of the low rigidity portion connecting the high rigidity portions, and a connection portion connecting the high rigidity portions is formed in a middle position in a width direction.

In this case, the slide guide can be caused to connect the high rigidity portions by combining a connection portion which is provided with cut-outs being cut out from ends on both sides of the low rigidity portion and provided in a middle position in a width direction, and a connection portion which is provided with a cut-out being cut out from an end on one side of the low rigidity portion and provided in the other end in the width direction.

It is preferable that the slide guide includes: the high rigidity portion which configures a guide allowing the seat belt to pass through the guide; and the low rigidity portion which configures a connection portion flexibly connecting the high rigidity portions so as to trace along a body shape of the a passenger.

According to the present invention, in a case of pulling out webbing when fastening a seat belt, an air belt portion can smoothly slide along a shoulder belt, thereby exhibiting effects that comfortableness can be sufficiently secured when fastening a seat belt and the air belt portion can be fastened at an appropriate position in order to restrain a passenger.

DETAILED DESCRIPTION OF THE PREFERRED EMBODIMENTS

Hereinafter, as an example of a passenger protection device according to the present invention, following examples will be described with reference to the accompanying drawings.

EXAMPLES

Figure 1:
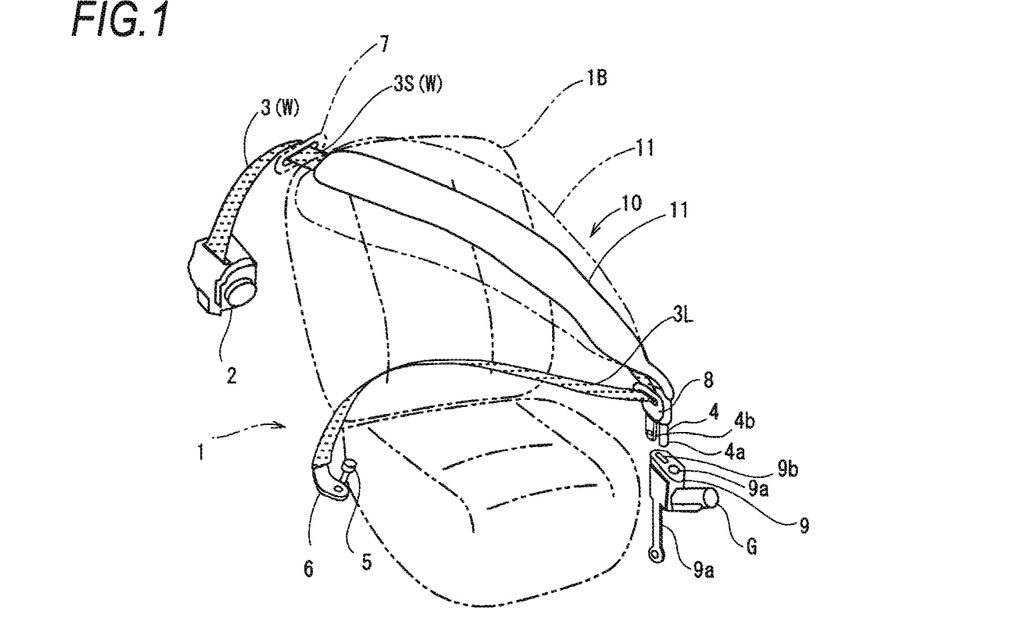
FIG. 1 is a perspective view illustrating an example of a configuration of indoor equipment in which a passenger protection device according to the present invention is embedded.

FIG. 1 is an explanatory perspective view schematically illustrating a state where the passenger protection device 10 (hereinafter, referred to as air belt apparatus 10 throughout the specification) according to the invention is installed in a crew seat 1. The drawing illustrates a state where a seat belt 3 pulled out from a retractor 2 is folded at a tong 4, and an end portion of the seat belt 3 is fixed to an anchor plate 6. The anchor plate 6 is fixed to a fixing portion (not illustrated) of a vehicle body via a fixing bolt 5. In the following description, the expression "seat belt" is used as a term indicating a case of restraining the passenger, and exhibiting a function thereof or a portion (for example, shoulder belt and the like). A woven fabric belt body which is wound around the retractor and configures the seat belt pulled out by a predetermined pulling force is referred to as "webbing".

As illustrated in FIG. 1, the retractor 2 is in a state of being accommodated inside a B-pillar (not illustrated) or a seat back 1B and being fixed to a predetermined position. A webbing W is in a state of maintaining a predetermined tensile force and being wound at a side of a seat in the initial stage when a passenger takes a seat. The webbing W is divided into a shoulder belt 3S and a lap belt 3L at a position of the tong 4 as a boundary. A portion for the lap belt 3L in the webbing W is wound around the retractor 2 when not in use. When the passenger takes a seat and pulls out the webbing W from the retractor 2 to draw the tong 4 near a buckle 9, as illustrated in FIG. 1, the portion for the lap belt 3L is secured. In this case, the passenger takes an action to grasp the webbing W close to oneself to pull out from the retractor 2 in a state of being seated. The position, in the shoulder belt 3S, corresponds to an air belt 11 in which an air bag 20 is folded to be accommodated. An aspect of causing the webbing W which is inserted into the air belt 11 not to be deformed when the air belt 11 is grasped is one of technical characteristics of the invention. A detailed configuration thereof will be described below with reference to FIGS. 4 to 12.

Figure 2:
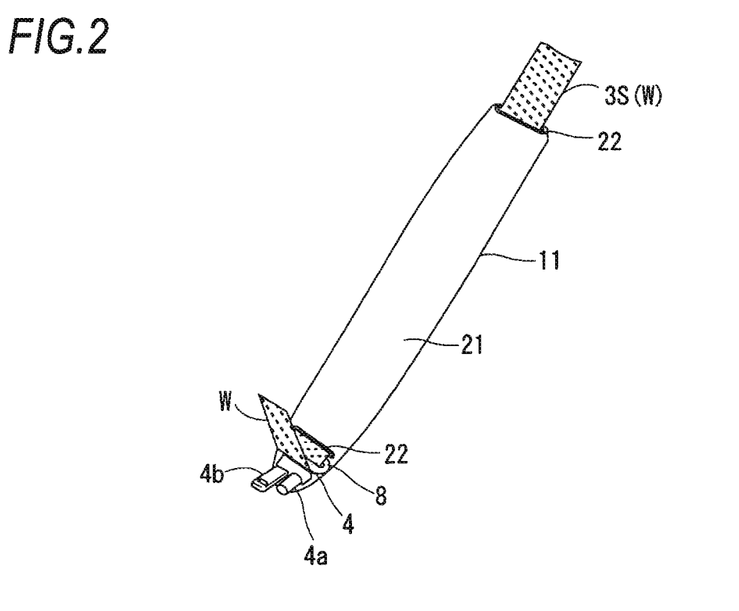
FIG. 2 is a schematic explanatory view of a configuration illustrating the passenger protection device illustrated in FIG. 1.

A description regarding another configuration for the air belt apparatus 10 disclosed in FIG. 1 will be supplemented. A shoulder anchor 7 is installed in an upper end on the right shoulder side of the seat back 1B. The shoulder anchor 7 is generally provided in an upper portion of the B-pillar and an upper end of the seat back 1B, and the shoulder belt 3S changes directions to be guided into the retractor 2 through the shoulder anchor 7. Meanwhile, a portion for the shoulder belt 3S in the webbing W is provided with the air belt 11 (Configuration thereof will be described below.), as illustrated in FIG. 2 in an extracted view. The tong 4 and a lap anchor 8 are integrally formed in an end portion of the air belt 11 of the invention 11, as illustrated in FIGS. 1 and 2. The tong 4 made of a synthetic resin is provided with a gas supply pipe 4a and a tong plate 4b. The gas supply pipe 4a is a metallic tubular body, and a gas supply passage (not illustrated) inside the tong 4 communicating with the gas supply pipe 4a is connected to a gas introduction port 20a of the air bag 20 illustrated in FIG. 3, in an airtight manner.

FIG. 1 further illustrates a buckle 9 which holds the gas supply pipe 4a and the tong plate 4b of the tong 4. The buckle 9 is fixed to a fixing portion (not illustrated) of the vehicle body at the side of the seat via a bracket 9a through a fixing member such as a bolt. A tong plate support hole 9b and a gas supply pipe connection hole 9a are formed in the buckle 9, and the tong plate 4b and the gas supply pipe 4a are respectively and simultaneously inserted into each hole of the buckle 9 when fastening the tong 4. A gas jetting port (not illustrated) of an inflator G externally attached to the buckle 9 communicates with the connection hole into which the gas supply pipe 4a is inserted. Therefore, at the time of a vehicle collision and the like, when a signal for operating the inflator G is transmitted, gas is jetted from the gas jetting port of the inflator G caused by ignition of an igniting agent inside the inflator G so that the air bag 20 (FIG. 3) expands in a substantial spindle shape along the shoulder belt 3S fastened by the passenger, via the gas supply pipe 4a. Thus, it is possible to suitably restrain the passenger in a range from the chest to an upper portion of the shoulder (In FIG. 1, expanded shape is indicated in a virtual line.).

Here, a configuration of the air belt 11 provided to be slidable with respect to the webbing W of the shoulder belt 3S will be described with reference to FIGS. 2 and 3. FIG. 2 is a view illustrating the appearance of the air belt 11 in which the webbing W of the shoulder belt 3S is inserted. The air belt 11 illustrated in the drawing has a configuration in which the internally positioned webbing W is a core member, and as illustrated in FIG. 3, the air bag 20 is folded in three-fold shape, thereby being covered with an outer cover 21. The outer cover 21 is made by stitching a fabric in a tubular shape, and sewing thread is cut to expose the expanded air bag when operated.

An opening guide ring 22 made of polyurethane resin is attached to an opening portion in both ends of the outer cover 21. The opening guide ring 22 is not easily deformed for having high rigidity, and a flat opening shape is maintained, thereby allowing the webbing W to reliably slide and decreasing sliding friction at that time.

Various types are proposed for a shape of the air bag 20 which functions as the air belt 11, and an unfolded state of an example of the shape of the air bag is illustrated in FIG. 3. The air bag 20 is divided into three divisions by forming seams (not illustrated) in two lines along the longitudinal direction. The divided division allows gas to communicate through a communication portion (not illustrated). The air bag 20 expands in substantially three cylindrical shapes in a row arranged in parallel approximately at the same time when gas is introduced to expand. In this case, tethers 23 are stitched on both surfaces of the air bag 20 in a plane shape so as to be able to cause the three cylinders arranged in parallel to be integrally operated in the plane shape. The same fabric as a base fabric of the air bag 20 is used for the tether 23. As illustrated in FIG. 3, the width of the tether 23 is set slightly smaller than overall width when the air bag 20 is unfolded in a planar manner. Accordingly, shapes of both surfaces of three cylindrical air bags 20 in a row arranged in parallel are regulated by the tether 23 at the time of expansion. As a result, the air bag 20 functions as an impact absorber having a shape close to a flat plane-shaped expander. Accordingly, three air bags 20 are integrated in a state where the air bag 20 is caused to expand, thereby achieving more reliable effect of restraining the passenger. The air bag 20 is provided with tucks 24 having a predetermined width so as to be folded and to fit the width of tether 23, in order to stitch along the tether 23 having a narrow width.

Figure 3A:
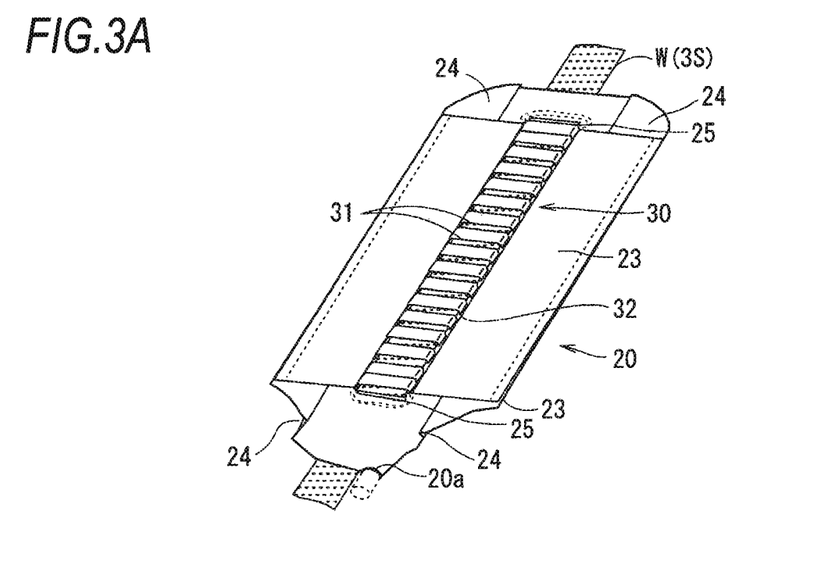
FIG. 3A is a schematic explanatory view illustrating an internal configuration of the passenger protection device illustrated in FIG. 2.

As illustrated in FIG. 3A, the air bag 20 which functions as the air belt 11 allows the webbing W to be inserted into slits 25 at two places formed in the vicinity of end portions of the air bag 20 in the longitudinal direction so as to be held by a portion of the shoulder belt 3S in a slidable manner. In this case, as illustrated in the drawing, the webbing W is caused to be inserted into a slide guide 30 having predetermined rigidity and bending flexibility. The air bags 20 on both sides of the webbing W are folded so as to wrap the slide guide 30, thereby being covered with the above-described mesh webbing and the outer cover 21. Thus, a shape of the air belt 11 (FIG. 2) is obtained.

Figure 3B:
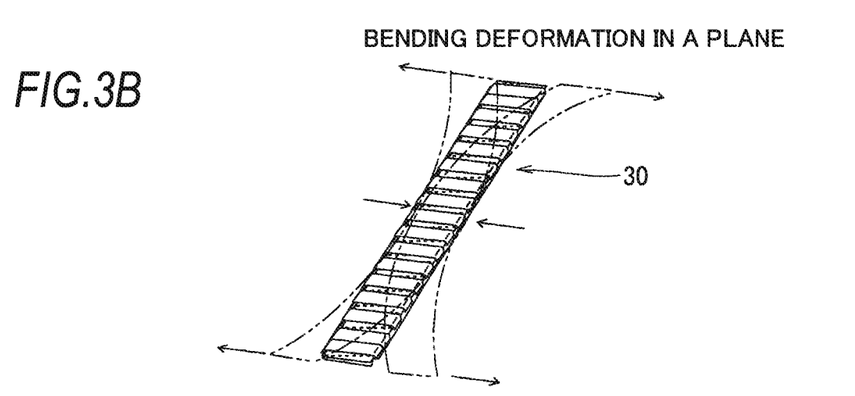
FIGS. 3B to 3D are schematic explanatory views illustrating deformation elements of an air belt as a passenger protection device.
Figure 3C:
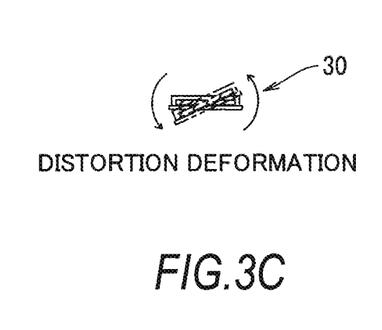
Figure 3D:
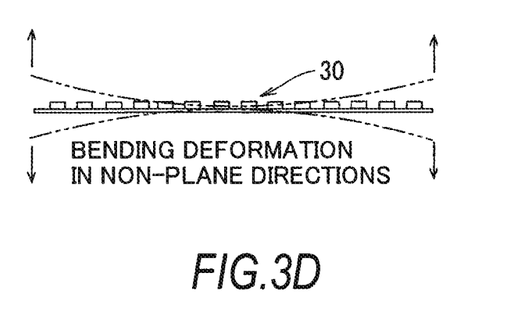

Hereinafter, a configuration of the slide guide 30 will be described with reference to FIG. 3A. Moreover, deformation elements occurring in the slide guide 30 when the passenger fastens the air belt 11 (FIG. 2) will be briefly described. As the functions required in the slide guide 30, initially, a smooth insertion of the webbing W needs to be secured, and then, when the passenger fastens the air belt 11, the slide guide needs to have the bending flexibility so as to fit a body shape of the passenger. As the deformation element for a criterion of the bending flexibility in the air belt 11, as illustrated in FIGS. 3B to 3D, there are a bending deformation in a plane including the air belt 11 and the webbing W inside thereof (FIG. 3B), a distorted deformation around an axial line of the air belt 11 in the longitudinal direction (FIG. 3C, for simplification, distortion in one direction (counterclockwise) is illustrated in the drawing, clockwise distortion is the same as well), and a bending deformation in non-plane directions with respect to the plane in FIG. 3B(Fig. 3D). When fastening the air belt 11, degrees of these deformations respectively varies due to the body shape of the passenger, a gender difference and the like. However, in all cases, when the passenger fastens the air belt 11, it is important to provide rigidity and bending flexibility of the air belt 11 so as to allow the air belt 11 to fit the body of the passenger within a range from the shoulder to the waist of the passenger.

Hereinafter, as examples, configurations of the air belt in various types, deformation operations thereof and the like will be described with reference to FIGS. 4 to 16. The slide guide 30 is basically configured to have a hard portion 31 as a high rigidity portion which allows the webbing W to be inserted therein and forms a space to secure the insertion of the webbing W, and a soft portion 32 as a low rigidity portion which extends in the longitudinal direction of the webbing W and maintains free bending of the webbing W in the longitudinal direction.

In the example, as illustrated in the drawing, the hard portion 31 configures a square tube-shaped or gate-type guide of which the inner dimension is slightly greater than the width of the webbing W, and which measures 1.5 cm in the longitudinal direction. The hard portion 31 has high rigidity in the width direction of the webbing W, and intervals between the hard portions 31 adjacent to each other in the longitudinal direction of the webbing W is set equal to or less than 1 cm. In the example, a polyurethane resin is used as a resin material configuring the hard portion 31. Moreover, as suitable materials, a polyester elastomer, a polyamide resin, a hard polyurethane resin, a polyester resin, a metal plate and the like can be used.

In the example, the soft portion 32 is an elongated plate-shaped body substantially equivalent to the width of the webbing W, and fixed to the tether 23 within a range in the longitudinal direction thereof illustrated in FIG. 3 by bonding or stitching. The surface of the soft portion 32 is smoothly finished so that sliding friction thereof is minimized when the webbing W moves in the longitudinal direction. In the example, a polyester elastomer is used as a resin material configuring the soft portion 32. Moreover, as suitable materials, a soft polyurethane resin, a silicone elastomer, rubber (synthetic rubber, natural rubber) and the like can be used. In this manner, in addition to the configuration in which the hard portion as the high rigidity portion and the soft portion as the low rigidity portion are made of materials of a plurality of types different in rigidity, it is possible to use the same materials different in rigidity grades (standard) thereof, or a difference of rigidity thereof can be secured through cross-sectional shapes of members. Hereinafter, examples of the configurations will be respectively illustrated in FIGS. 4 to 12.

(Attachment Structure of Soft Portion and Hard Portion)

Figure 4A:
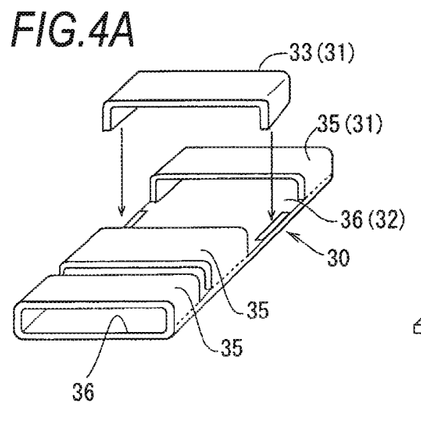
FIGS. 4A and 4B are partially enlarged views illustrating an example of slide guides embedded in the passenger protection device.
Figure 4B:
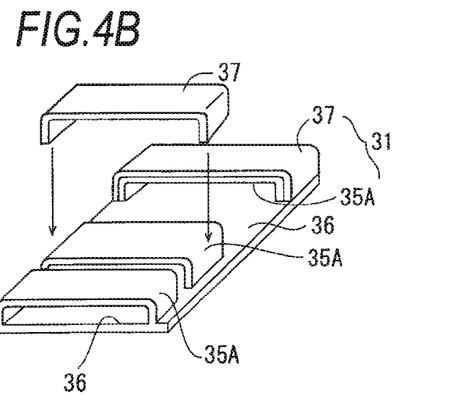

FIG. 4 illustrates an example of manufacturing the tubular slide guide 30 by molding gate-type guide parts 33 made of the hard resin material as the hard portion 31 in advance, and by integrally molding the guide parts 33 and a plate-shaped portion 36 made of a soft resin material as a base material, in a state of supporting the molded guide parts 33 by spacers (not illustrated) inside the metal mold at predetermined intervals. According to this molding method, the light weight slide guide 30 which is integrally configured to have guide portions 35 as the hard portion 31 and the plate-shaped portion 36 as the soft portion 32 can be manufactured through a small process. FIG. 4B shows a configuration in which the plate-shaped portion 36 and gate-type guides 35A are formed using the soft resin material, and gate-type stiffening members molded of the hard resin material are brought into close contact with the circumference of the gate-type guide 35A. According to this configuration, the hard portion 31 is configured to have the gate-type guide 35A made of the soft resin material and the stiffening member 37 made of the hard resin material, and thus, rigidity of the hard portion 31 can be sufficiently enhanced.

Figures 5A, 5B, 6A, 6B, 6C:
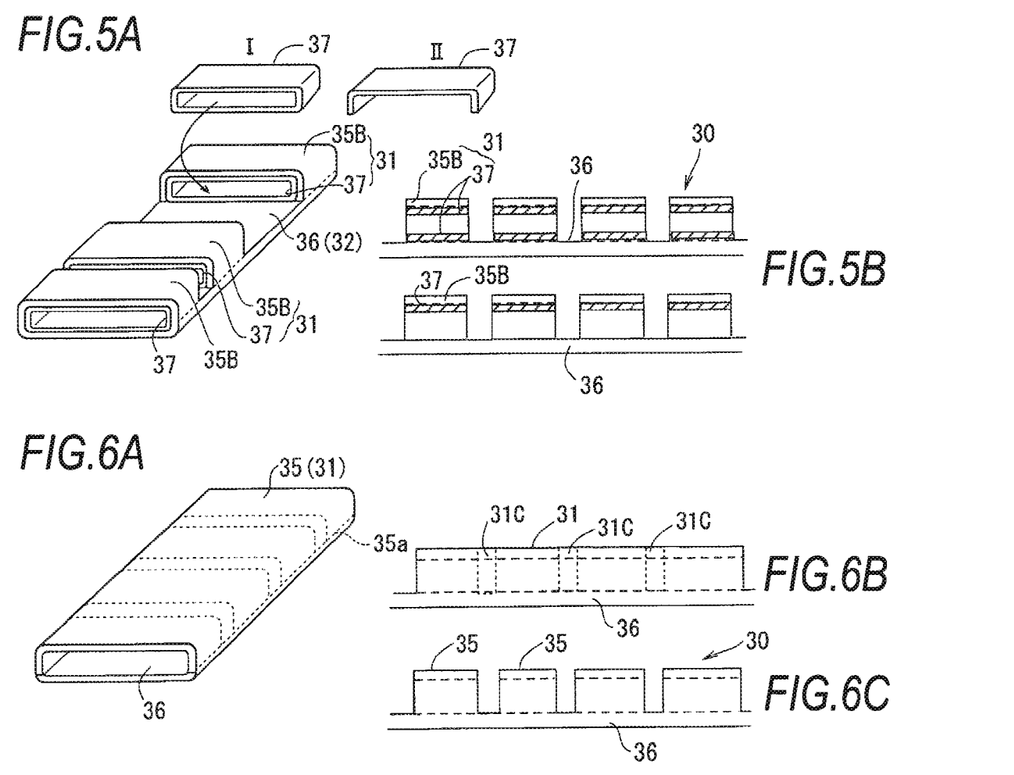
FIG. 5A is a partially enlarged view illustrating another example of the slide guide.
FIGS. 5B are cross-sectional views illustrating examples of cross sections thereof.
FIGS. 6A to 6C are partially enlarged views illustrating another example of the slide guide.

FIG. 5A shows a configuration in which the plate-shaped portion 36 and gate-type guides 35B having the same width are formed using the soft resin material, and the tubular (I) or gate-type (II) stiffening members 37 molded of the hard resin material are caused to fit in the inner circumferential portion of the gate-type guide 35B. According to this configuration, the hard portion 31 is configured to have the gate-type guide made of the soft resin material and the tubular or gate-type stiffening member 37 made of the hard resin material. Thus, an outer shape portion with which the folded air bag 20 comes into contact can be finished to be soft, and rigidity of the hard portion 31 can be also sufficiently enhanced. FIG. 5B shows longitudinal sectional views of portions of the guide illustrating states of fitting the stiffening members 37 (tubular member (I), gate-type member (II)).

FIGS. 6A and 6B show a tubular basic-shaped member in which the plate-shaped portion 36 is formed using the soft resin material, and leg portions 35a of the gate-type guide 35 are integrally molded with the plate-shaped portion 36 using the hard resin material so as to cover the entire plate-shaped portion 36. In the basic-shaped member, gate-type hard portions 31C are cut out at predetermined intervals as indicated by dotted lines, thereby completing the slide guide 30 in which the plate-shaped portion 36 made of the soft resin material and the gate-type guides 35 made of the hard resin material are integrally formed as illustrated in FIG. 3C. The shape is the same as that in FIG. 4A.

Figures 7A, 7B:
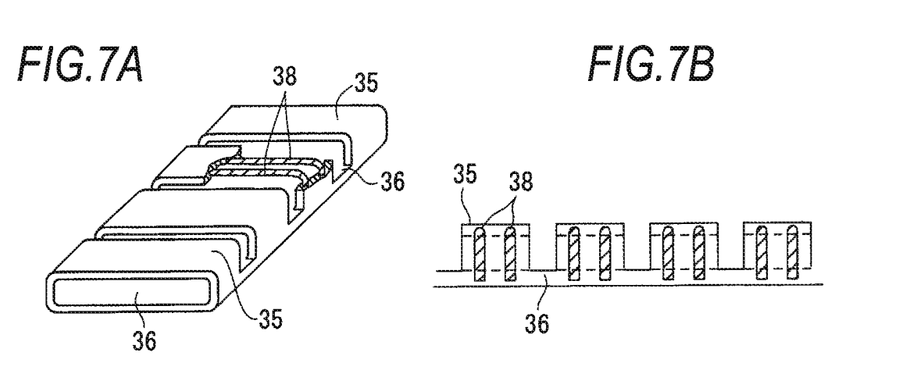
Figs. 7A and 7B are partially enlarged views illustrating another example of the slide guide.

FIG. 7A. is an example in which the plate-shaped portion 36 and the gate-type guides 35 at predetermined intervals are integrally molded using the soft resin material, and reinforcement steel material 38 which are bent wire materials are embedded inside the gate-type guides 35. In the example, since the gate-type guide 35 itself is a molded portion made of the soft resin material, deformations partially occur but the shapes of gate-type guides 35 through which the webbing (not illustrated) passes are maintained by the reinforcement steel material 38. FIG. 7B is a longitudinal sectional view of a portion illustrating an arrangement example of the reinforcement steel materials 38 inside the gate-type guide 35.

Figures 8A, 8B:
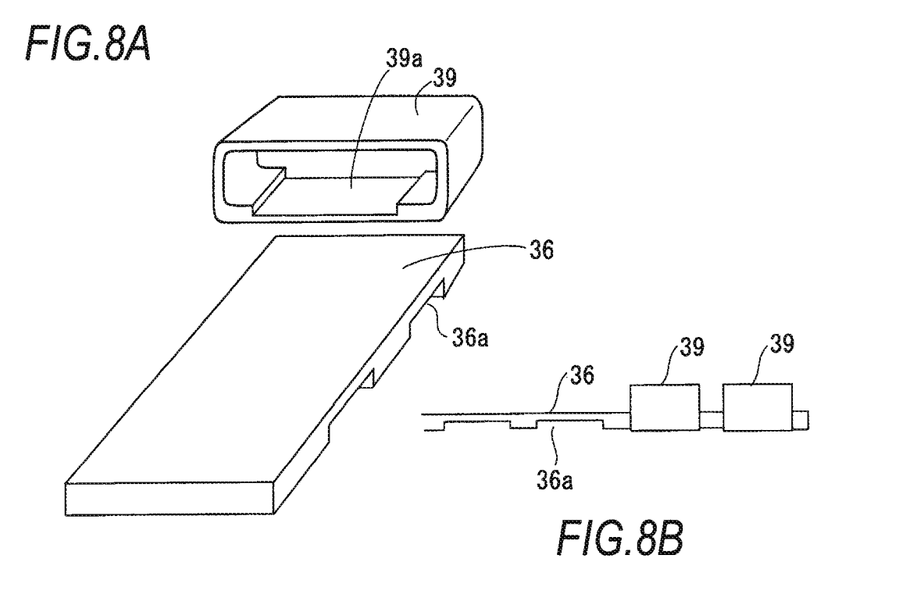
FIGS. 8A and 8B are partially enlarged views illustrating another example of the slide guide.

FIG. 8A shows that recess portions 36a and 39a are respectively formed on facing surfaces of the plate-shaped portion 36 molded of the soft resin material and square tube-shaped guides 39 molded of the hard resin material to be able to engage with each other. The square tube-shaped guides 39 are caused to engage with the plate-shaped portion 36 at predetermined locations, and thus, the gate-type guides 35 (for example, refer to FIG. 6C) can be manufactured to be integrated with the plate-shaped portion 36 by using the square tube-shaped guides 39 made of the hard resin material.

Figure 9A:
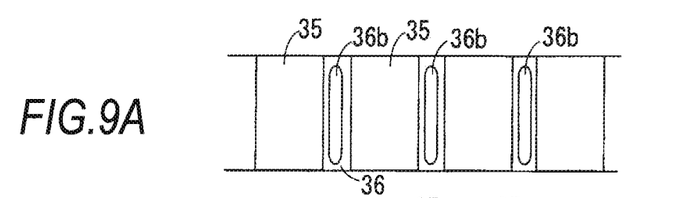
FIGS. 9A to 9C are partially enlarged views illustrating another example of the slide guide.
Figure 9B:
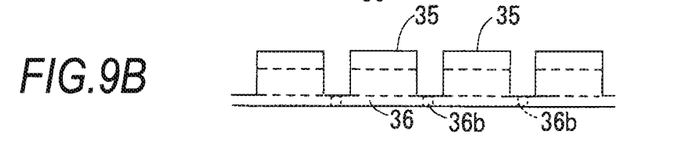
Figure 9C:
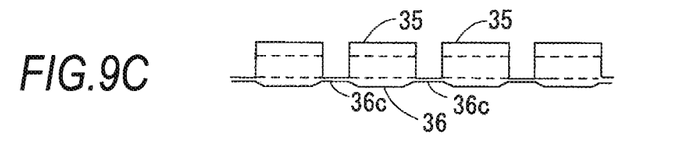

FIGS. 9A. and 9B illustrate an example of a configuration in which the thick gate-type guides 35 are molded by using one type of material which is elastically deformable having proper rigidity, and slits 36b are formed in the plate-shaped portion 36 between the gate-type guides 35 so as to lower the rigidity thereof to be bendable. FIG. 9C is an example of portions 36c which are provided by causing the thickness of the plate-shaped portion 36 between the gate-shaped guides 35 to be further thinner, thereby securing flexibility by utilizing easily-bendable property of the plate-shaped member 36c. In the example, it is preferable to use the above-described hard resin material or to adopt a material having rigidity of which degree is intermediate between those of the hard resin material and the soft resin material.

Figure 10A:
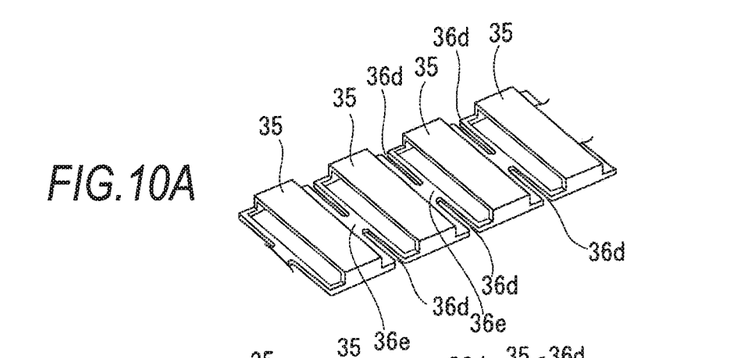
FIGS. 10A and 10B are partially enlarged views illustrating another example of the slide guide.
Figure 10B:
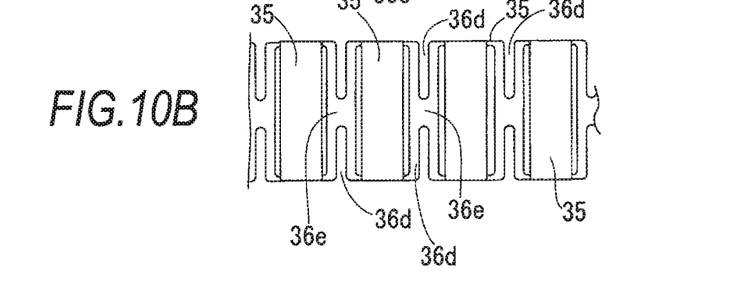
Figure 11A:
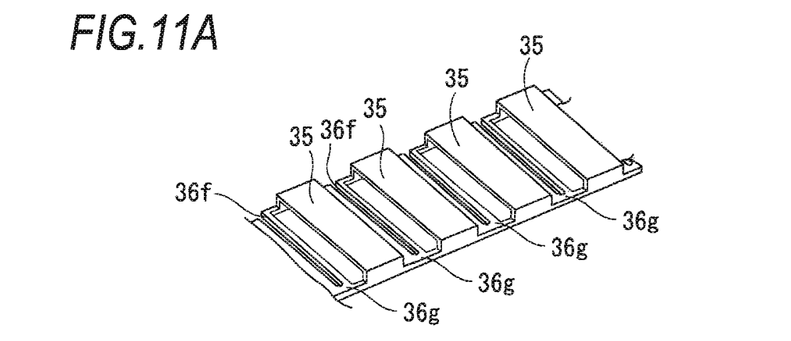
FIG. 11A and 11B are partially enlarged views illustrating another example of the slide guide.
Figure 11B:
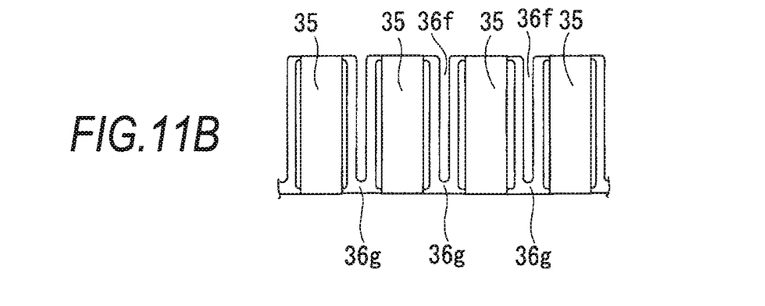

FIGS. 10 and 11 illustrate examples which are configured to have the gate-type guides 35 and the plate-shaped portion 36 causing each of the gate-type guides to be successive, and in which the plate-shaped portion 36 is caused to be in shapes of connection portions having low rigidity. The example is similar to the configuration in each drawing of FIG. 9 in respect of being configured to have the gate-type guides 35 and the plate-shaped portion 36. However, the example is characterized in respect that overall material is configured to be of the hard resin material, and a cross-sectional shape of the connection portion of the gate-type guides 35 in the plate-shaped portion 36 is caused to be extremely small. In other words, in the example illustrated in FIGS. 10A and 10B, as the shape of the plate-shaped portion 36 connecting the gate-type guides 35 is illustrated in FIG. 10B, the gate-type guides 35 are connected at only central portion 36e being in a substantially H-shape provided with cut-outs 36d from both end sides (hereinafter, refer to as H-connection type). In this manner, since the adjacent gate-type guides 35 are connected at only the central portion 36e which is a remaining portion after forming the cut-outs 36d on both sides, thereby exhibiting a flexible deformation property with respect to all the deformation elements in FIGS. 3B to 3D. In the example illustrated in FIGS. 11A and 11B, as the shape of the plate-shaped portion 36 connecting the gate-type guides 35 is illustrated in FIG. 10B, cut-out 36*f* is provided from only one side in the width direction so as to connect the adjacent gate-type guides 35 by only one end portion 36*g* in the width direction in a substantially U-shape in a plan view (hereinafter, refer to as U-connection type). In this manner, since the adjacent gate-type guides 35 are connected to each other by only one end portion 36*g* remaining the cut-out 36*f*, as bending operation in the plane illustrated in FIG. 3B, there is a tendency of being easily bent on a side where the cut-outs 36*f* are arranged. Regarding distortion deformation illustrated in FIG. 3C, the distortion amount of each gate-type guide 35 on the side where the cut-outs 36*f* are formed becomes great.

Incidentally, the slide guides 30 which are respectively formed with the H-connection type and the U-connection type illustrated in each drawing of FIGS. 10 and 11 are caused to have small cross-sectional shapes in the connection portions, and thus, even though the plate-shaped portion 36 is integrally molded therewith by using a polyamide resin, a polyurethane resin and a polyester elastomer as the hard resin material described above, desired displacement amounts can be respectively secured with respect to each of the above-described deformation elements. Therefore, in the slide guide 30 embedded in one air belt 11, as illustrated in FIGS. 10A and 11A, by providing the connection shape location in various manners, the overall bending characteristics of the slide guide can be changed, and thus, it is possible to adjust feeling of fit when fastening the air belt.

Figure 12:
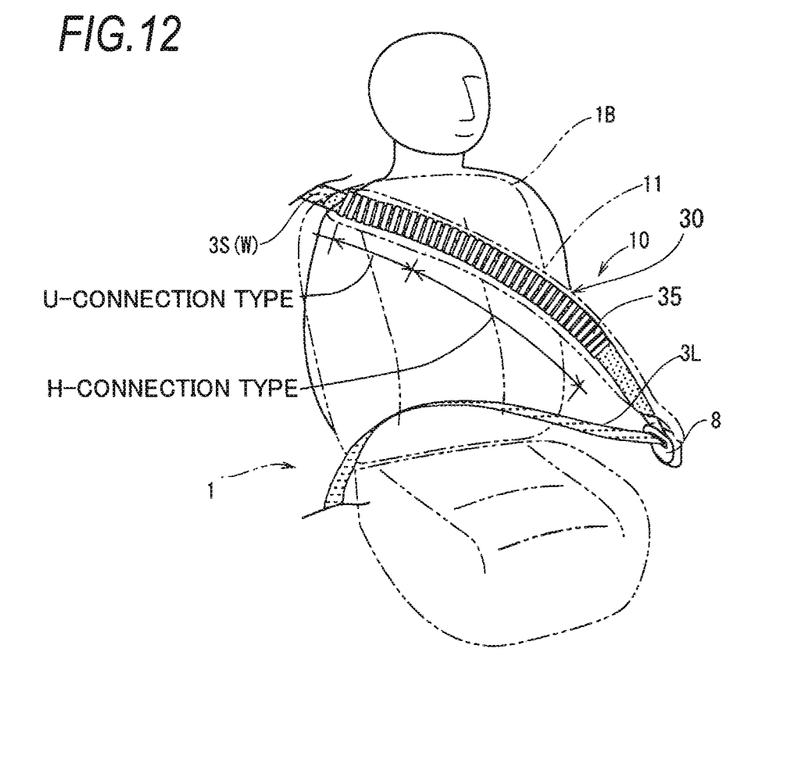
FIG. 12 is an explanatory view illustrating a fitting state of the slide guide illustrated in FIGS. 10 and 11 when restraining a passenger.

Hereinafter, an example thereof will be described with reference to FIG. 12. FIG. 12 is an explanatory view schematically illustrating only the slide guide 30 inside the air belt 11 in a state where the passenger fastens the air belt 11. The slide guide 30 comes into contact with a range from vicinity of the upper waist to the front chest of the passenger. Then, the slide guide 30 sharply changes its angle in the vicinity of the collar bone on the right, thereby guided to a slip anchor (not illustrated) or an insertion slit (not illustrated) of a seat belt winding device. Accordingly, in order to improve the feeling of the passenger when fastening the air belt 11, a portion of the slide guide 30 corresponding to the vicinity of the chest is configured to be of the above-described H-connection type so as to give priority to the bending deformation in non-plane directions, and a portion of the slide guide 30 corresponding to the range from the upper chest to the shoulder is configured to be of the U-connection type, and thus, it is possible to further improve the feeling of fit of the air belt 11.

Figure 13A:
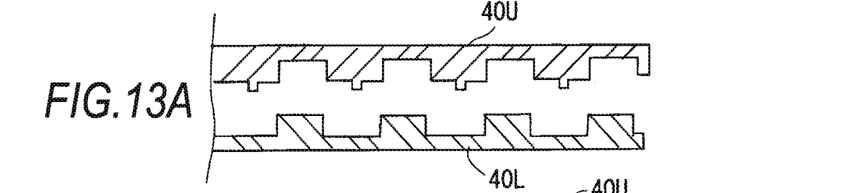
FIGS. 13A to 13C are explanatory views illustrating a metal mold for manufacturing the slide guide illustrated in FIGS. 10 and 11, and a manufacturing steps thereof.
Figures 13B, 13C:
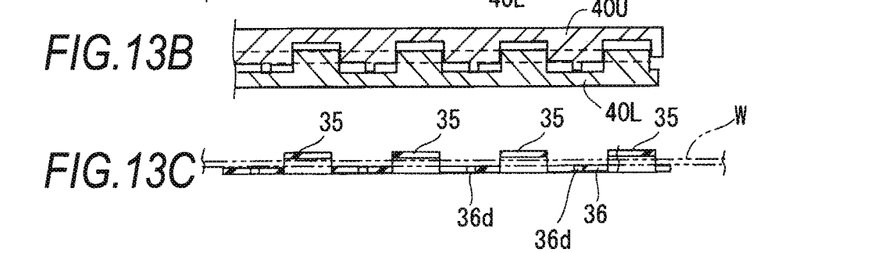

The air belt 11 illustrated in each drawing of FIGS. 10 and 11 described above has an advantage when manufacturing as well. In other words, a pair of upper and lower metal molds 40U and 40L illustrated in FIG. 13A are set as illustrated in FIG. 13B, and thus, it is possible to perform molding by filling a resin in a space formed between the metal molds 40U and 40L. In other words, in a case illustrated in each drawing in FIG. 9, a core (slide type) is required in order to form a space allowing the webbing W to pass through. In contrast, in this case, there is an advantage in that the slide guide 30 through which the webbing W illustrated in FIG. 13C can be freely inserted can be molded by the pair of upper and lower metal molds 40U and 40L.

Figure 14:
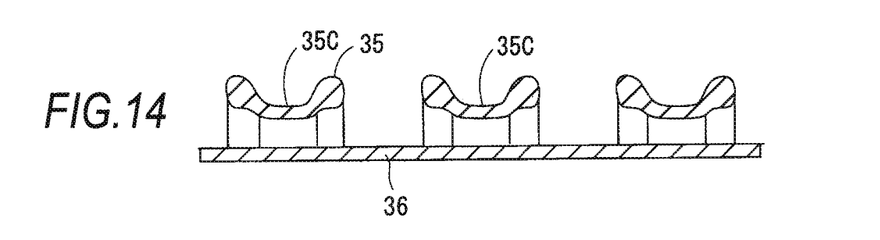
FIG. 14 is a partially enlarged view illustrating another example of the slide guide.

FIG. 14 illustrates an example in which rib portions 35*c* made by bent cross section are formed in the gate-type guides 35 so as to enhance rigidity on the cross section on account of the rib portions 35*c*. In this case, it is preferable that the plate-shaped portion 36 have flexibility and the gate-type guides 35 having the rib portions 35*c* secure rigidity and deformation friction property which are relatively high respect to the plate-shaped portion 36.

Figure 15A:
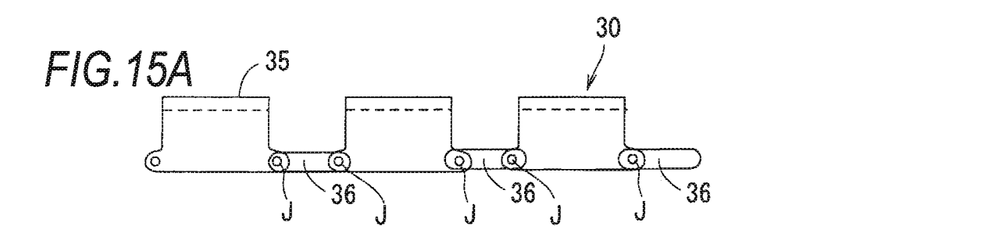
FIGS. 15B are partially enlarged views illustrating another example of the slide guide.
Figure 15B:
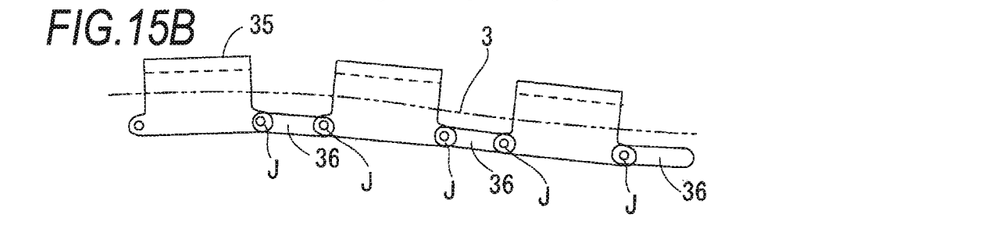

In FIG. 15A, joint portions J formed with pins and the like are provided between the plate-shaped portion 36 made of soft material as a connection portion connecting the gate-type guide 35 formed to be the hard portion and the adjacent gate-type guide 35, and a bending operation in a position of the joint portion J causes the plate-shaped portion 36 to relatively displaced, and thus, it is possible to flexibly bend the entire slide guide 30 along with the body shape of the passenger (FIG. 15B). In this case, since the plate-shaped portion 36 and the joint portions J perform a flexible operation as the slide guide 30, it is possible to use one type of material having rigidity intermediate between the hard resin material and the soft resin material in the gate-type guides 35 and the plate-shaped portion 36, as described above. If the overall slide guide 30 can be deformed so as to fit the body shape of the passenger when the passenger fastens the seat belt, by sufficiently lowering (to be flexible) rigidity of the plate-shaped portion 36 as a connection portion, it is possible to cause the connection portion to function as a low rigidity portion, even though the joint portion J is not provided between the high rigidity portions.

Figures 16A, 16B:
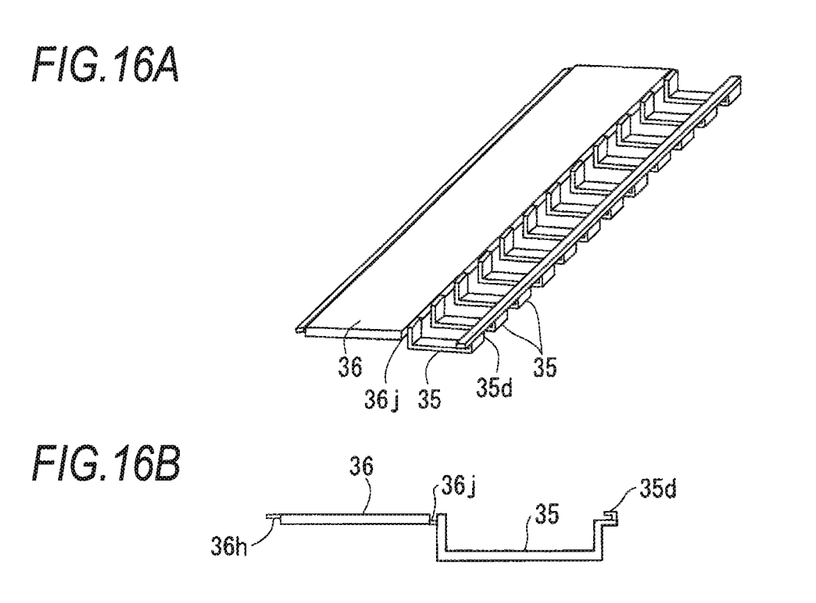
FIGS. 16A to 16C are partially enlarged views illustrating another example of the slide guide.
Figure 16C:
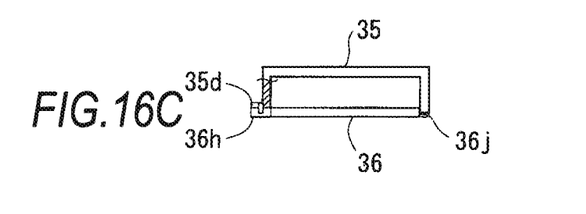

FIG. 16A is an explanatory view schematically describing a detailed molding method of the slide guide 30. As illustrated in FIGS. 16A and 16B, the slide guide 30 is configured to have a bending week portion 36*j* and which is integrally molded in a wide open state with the gate-type guides 35 made of the hard resin material and caused to be successive at predetermined intervals in the longitudinal direction and the plate-shaped portion 36 made of soft resin materials via the bending weak portion 36*j*. Then as illustrated in FIG. 16C, the gate-type guides 35 are bent so as to overlap the plate-shaped portion 36 at the bending weak portion, and an engagement portion 35*d* formed in an end portion of the successive gate-type guides 35 and an engagement portion 36*d* formed on one side of the plate-shaped portion 36 are connected, and thus, the slide guide 30 having predetermined gate-type guides 35 can be assembled. Despite of absence of drawings, a pin-shaped body may be caused to penetrate an opening so as to perform fusion on the tip thereof to be attached, or a grommet structure may be connected in the configuration, in place of the engagement portion.

The invention is not limited to the examples described above, and various changes can be made within a range described in the claims. In other words, the embodiments which can be acquired by combining technical methods which are appropriately changed within a range described in the claims are also included in the technical range of the invention.

The invention claimed is:
1. A passenger protection device comprising:
an air bag that is provided in a shoulder belt position of a seat belt to be able to expand by receiving a predetermined operation signal,
wherein the seat belt is wound by one winding device,
wherein the air bag is folded along a slide guide being provided along an insertion direction of the seat belt and being configured to have a high rigidity portion and a low rigidity portion,
wherein when pulling out the seat belt, the air bag slides along the seat belt through the slide guide, and
wherein the slide guide includes:
the low rigidity portion which configures a plate-shaped body fixed to the air bag; and the high rigidity portion which is integrally formed with the plate-shaped body and which configures a guide allowing the seat belt to pass through the guide.

2. The passenger protection device according to claim 1, wherein the slide guide has gate-type or tubular-shaped guides which are arranged at predetermined intervals along a surface on one side of the plate-shaped body extending in a longitudinal direction of the air bag.

3. The passenger protection device according to claim 1, wherein the high rigidity portion of the slide guide is a molded body made of a hard resin material and the low rigidity portion of the slide guide is a molded body made of a soft resin material.

4. The passenger protection device according to claim 1, wherein the plate-shaped body of the slide guide is bonded or stitched to a tether surface which is provided in the air bag.

5. The passenger protection device according to claim 1, wherein the high rigidity portion and the low rigidity portion of the slide guide are made of the same resin material, and a difference of rigidity between the high rigidity portion and the low rigidity portion is secured through cross-sectional shapes of members.

6. The passenger protection device according to claim 5, wherein the slide guide is provided with cut-outs which are cut out from ends on both sides of the low rigidity portion connecting the high rigidity portions, and a connection portion connecting the high rigidity portions is formed in a middle position in a width direction.

7. The passenger protection device according to claim 5, wherein the slide guide is provided with a cut-out which is cut out from an end on one side of the low rigidity portion connecting the high rigidity portions, and a connection portion connecting the high rigidity portions is formed in the other end in a width direction.

8. The passenger protection device according to claim 5, wherein the slide guide is caused to connect the high rigidity portions by combining a connection portion which is provided with cut-outs being cut out from ends on both sides of the low rigidity portion and which is provided in a middle position in a width direction, and a connection portion which is provided with a cut-out being cut out from an end on one side of the low rigidity portion and which is provided in the other end in the width direction.

9. The passenger protection device according to claim 1, wherein the high rigidity portion and the low rigidity portion of the slide guide are configured to be made of materials of a plurality of types different in rigidity or to be made of the same materials different in rigidity grades.

10. The passenger protection device according to claim 1, wherein the slide guide includes:
the high rigidity portion which configures a guide allowing the seat belt to pass through the guide; and
the low rigidity portion which configures a connection portion flexibly connecting the high rigidity portions so as to trace along a body shape of a passenger.

* * * * *